United States Patent [19]

Sato et al.

[11] 4,092,036
[45] May 30, 1978

[54] PIPE JUNCTION HOLDER

[75] Inventors: Toshiyuki Sato; Hideo Edo, both of Osaka, Japan

[73] Assignee: Kabushiki Kaisha Suiken, Osaka, Japan

[21] Appl. No.: 750,626

[22] Filed: Dec. 15, 1976

[30] Foreign Application Priority Data

Dec. 15, 1975  Japan .......................... 50-169916[U]

[51] Int. Cl.² .............................................. F16L 19/02
[52] U.S. Cl. ................................... 285/337; 285/321; 285/374; 85/155
[58] Field of Search ............... 285/337, 403, 404, 374, 285/90, 421, 321; 403/314, 370, 374; 151/70; 85/155

[56] References Cited

U.S. PATENT DOCUMENTS

| | | | |
|---|---|---|---|
| 1,581,973 | 4/1926 | Meyer | 285/404 X |
| 3,333,872 | 8/1967 | Crawford et al. | 285/404 X |
| 3,781,042 | 12/1973 | Estlick | 285/404 X |
| 3,941,410 | 3/1976 | Miyaoka | 285/404 X |

*Primary Examiner*—Dave W. Arola
*Attorney, Agent, or Firm*—Birch, Stewart, Kolasch & Birch

[57] ABSTRACT

A pipe junction holder which comprises a substantially annular body with which are formed a plurality of spaced clamping blocks comprising a vertical front wall, a pair of vertical side walls, and a lateral top wall which extends descendingly or downwardly away from the front wall and is formed with a non-threaded hole which is elliptical in shape and extends with an inclination relative to a longitudinal axis of a pipe on which the pipe junction holder is mounted. Within the hole is received a bolt having a shank with an integral annular flange formed therewith, in such a manner that an upper slanted surface of such an annular flange is slidable along a lower slanted surface of the top wall. In addition, on a threaded end portion of the bolt shank is engageably mounted a pipe pressing member including a pair of edges formed on its bottom end surface.

21 Claims, 11 Drawing Figures

PIPE JUNCTION HOLDER

BACKGROUND AND SUMMARY OF THE INVENTION

The present invention is related to a pipe junction holder, and more particularly is directed to an improved pipe junction holder which can be used for connecting a pair of axially aligned liquid conduit pipes or tubes firmly together and for effectively preventing the pair of joined pipes from undesirable disengagement as occasionally occurs in the conventional prior art devices when an extraordinarily great pressure is abruptly applied in the axial direction.

Several types of pipe junction holders with disengagement preventing means are known in the prior art. The common type of the conventional pipe junction holder comprises a substantially annular body having a plurality of through holes with internal threads, each of the through holes being formed so as to radially extend so that its central line may meet at right angles to the longitudinal axis of the aligned pipes. A plurality of bolts are inserted into said through holes, each of the bolts having a threaded shank which is normal to a pipe periphery and passes through said hole in engagement with the internal threads of the hole. These prior art devices include a plurality of push members which are respectively interposed between the bottom end of the threaded shank and the peripheral surface of a pipe on which the pipe junction holder is mounted, each of said push members having at one side a rough, anti-sliding surface which is in contact with the peripheral surface of the pipe. In such a type of conventional prior art device, the pipe holding force, which is given by clamping the bolts, is constant, and as a matter of course, it is impossible to advantageously respond to a sudden increase in the pressure which is imparted in the axial direction to the internal surface of joined pipes by a rapid flow of liquid running through the pipes so as to let a pipe out of joint. Thus, it occasionally happens that one of the joined pipes is released from the other as an extraordinarily great pressure is experienced beyond the constant pipe holding force.

In addition to the above-described first conventional prior art device a further type of pipe junction holder as illustrated in FIG. 8 has recently been proposed. This second type of pipe junction holder comprises a substantially annular body 1 having a plurality of non-threaded through holes 2, each of the through holes 2 being elliptical in shape and extending radially so that its central line may meet at right angles to the longitudinal axis of aligned pipes 3. A plurality of bolts 4 are inserted into said through holes 2, each of the bolts 4 having a threaded shank 4a which is positioned perpendicular to a pipe periphery and passes through the hole 2 and a pair of edges 5 provided on the bottom end surface of each bolt shank. A plurality of nuts 6 are engageably mounted on each threaded bolt shank 4a, each of the nuts 6 having a slanted upper surface 7 which is declined away from a vertical wall 8 of the annular body 1. The slanted upper surface 7 is slidably contactable with an inclined surface 9 provided with one portion of the annular body 1. In this second type of prior art device, as the bolt 4 is turned, the bottom end of the threaded bolt shank 4a presses the peripheral surface of a pipe 3 on which the device is mounted, and at the same time, the nut 6 moves upward so that its upper slant surface 7 contacts the opposed slanted surface 9 of the annular body. Thus, when a great pressure is applied in one lateral direction so as to cause a pipe 3 to release and move slightly, the bolt 4 together with the nut 6 is also urged to move slightly in the same lateral direction within the elliptical hole 2. At this stage, as the slanted surface 7 of the nut 6 is urged to slide outwardly along the slanted surface 9 of the annular body, the former surface is forcibly pressed downward by the latter surface, resulting in that the bolt 4 is forcibly pushed down toward the pipe periphery so that a pair of edges 5 of the shank end can securely dent or eat into the pipe wall to prevent the pipe 3 from releasing. Thus, it will be easily understood that this second type of known prior art pipe junction holder is more advantageous as compared to the above-described first type of prior art devices in preventing the undesirable disengagement of joined pipes. However, the second type of prior art device still has a number of disadvantages. The first is that the contact area is not sufficient since it is limited to the bottom end surface of the bolt shank. The second is that the whole edges cannot eat into a pipe wall and also the edges cannot eat deeply into the pipe wall, because the bolt shank is disposed so as to be perpendicular to the pipe periphery. The third is that when a pair of edges are provided along the margin of the bottom end surface of the bolt shank in order to make the distance between the pair of edges as large as possible, they are easily broken, while, if the pair of edges are provided inwardly away from the margin of the shank end surface, the distance between the pair of edges is not enough to develop a satisfactory holding force to carry out the prevention of disengagement of the joined pipes. The fourth is that the structure is not very strong, durable or stable. Because of the four disadvantages mentioned above, the second type of known pipe junction holder has proved to be insufficient in developing a desired pipe holding force for preventing the disengagement of the joined pipes.

Accordingly, one of the objects of the present invention is to provide a pipe junction holder which eliminates all of the problems in the prior art as set forth hereinabove.

Another object of the present invention is to provide a pipe junction holder which develop a sufficient pipe holding force to prevent a pair of joined pipes from undesirable disengagement.

A further object of the present invention is to provide a pipe junction holder which includes a sufficiently large contact area with respect to a periphery of a pipe on which the pipe junction holder is mounted.

Still another object of the present invention is to provide a pipe junction holder which has a plurality of edges formed adjacent the bottom end surface of a bolt shank so that the edges can eat deeply into a peripheral wall of a pipe on which the pipe junction holder is mounted.

A still further object of the present invention is to provide a pipe junction holder which is very strong and durable in structure as well as stable in use.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

The pipe junction holder according to the present invention comprises a substantially annular body containing an annular projection which abuts against a known packing, at least three clamping blocks disposed in spaced relation with an equal interval therebetween, and a plurality of internally threaded through holes formed in the wall of the annular body. The holes extending in the wall of the annular body extend in parallel relation to the longitudinal axis of the aligned pipes on which the pipe junction holder is mounted. Each of said clamping blocks comprises a vertical front wall integral with said annular projection, a pair of side walls, and a lateral top wall which extends descendingly or downwardly away from said front wall. All of these walls are integral with one another, so that the clamping block is formed with an internal hollow space defined by said front wall, the top wall and a pair of side walls. The declined top wall presents an external and an internal surface, both of which are flat and smooth and extend in parallel with each other so as to become gradually declined as they get far from said front wall. Further, the top wall is provided with a non-threaded through hole which is elliptical in shape and extends perpendicularly relative to the inclined top wall. In other words, this through hole is inclined relative to the axial line of a pipe on which the pipe junction holder is mounted.

A bolt with an annular flange formed integral with its shank is received in said non-threaded hole with the flange slidably abutted on said internal slanted surface of the inclined top wall. The bolt shank is formed with threads at a portion between its bottom end and said annular flange. The bolt is arranged so that it can freely turn within the non-threaded elliptical hole and also can move in the direction of the longer diameter of the elliptical hole. At the threaded end portion of the bolt shank, a pipe pressing member is engageably mounted. The pipe pressing member is received within the hollow space of the clamping block in such a manner that its side walls are in contact with said side walls of the clamping block. Thus, the pipe pressing member is restricted from turning within the hollow space of the clamping block. The upper slanted surface of the member may come into contact relation with the lower surface of said annular flange of the bolt shank. On the bottom surface of the member there are provided a plurality of edges which are of such a configuration as to permit the denting or eating into a pipe peripheral wall.

In view of the construction as set forth hereinabove, when the bolt of the clamping block is turned, a pipe pressing member is moved downward to impart a clamping pressure to a periphery of a pipe on which the pipe junction holder is mounted, whereby an initial pipe holding force is obtained. Subsequently, when a great axial pressure produced by the liquid flow acts on the internal wall of the pipe so that the pipe is forced to move slightly outward, the bolt is also moved outwardly and at the same time the annular flange is urged to slide along the lower slanted surface of the top wall of the clamping block, resulting in that the bolt is forcibly pushed downward. Consequently, a pair of edges of the pipe pressing member securely dent or eat into the pipe wall to effectively prevent the further movement of the pipe. At this stage, because the bolt is inclined so as to counteract the movement of the pipe, the edges of the pipe pressing member can securely dent or eat more deeply into the pipe wall than those which are formed with the bolt shank end as disclosed in the prior art. Further, the distance between a pair of edges of the present invention can be set wider than that of a pair of edges provided with the bolt shank end as discussed in the prior art, and as a result, a more efficient and stable pipe pressing function can be achieved as compared to the prior art. Furthermore, the clamping block of the present invention is by far strong and more durable in structure as well as stable in use as compared to any of the prior art.

BRIEF DESCRIPTION OF THE DRAWINGS

The present invention will become more fully understood from the detailed description given hereinbelow and the accompanying drawings which are given by way of illustration only, and wherein.

DESCRIPTION OF THE PREFERRED EMBODIMENTS

Figure 1:
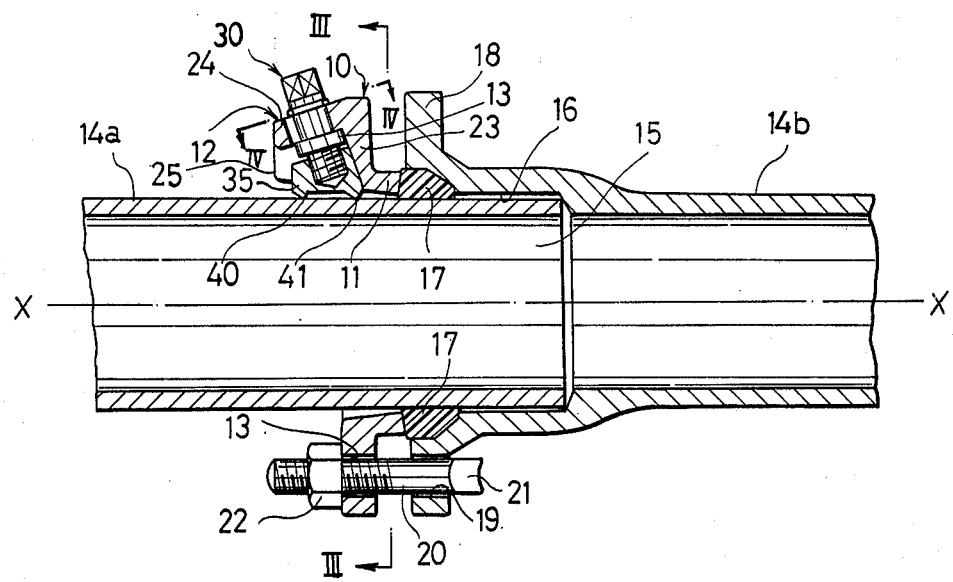
FIG. 1 is a sectional elevation showing how the pipe junction holder of the present invention is fixed on a pair of joined pipes.
Figure 2:
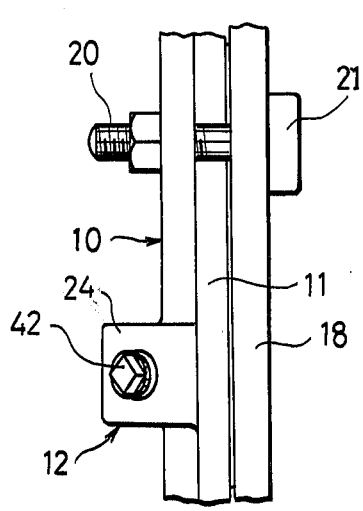
FIG. 2 is an enlarged fragmentary top plan view of the pipe junction holder of FIG. 1.
Figure 3:
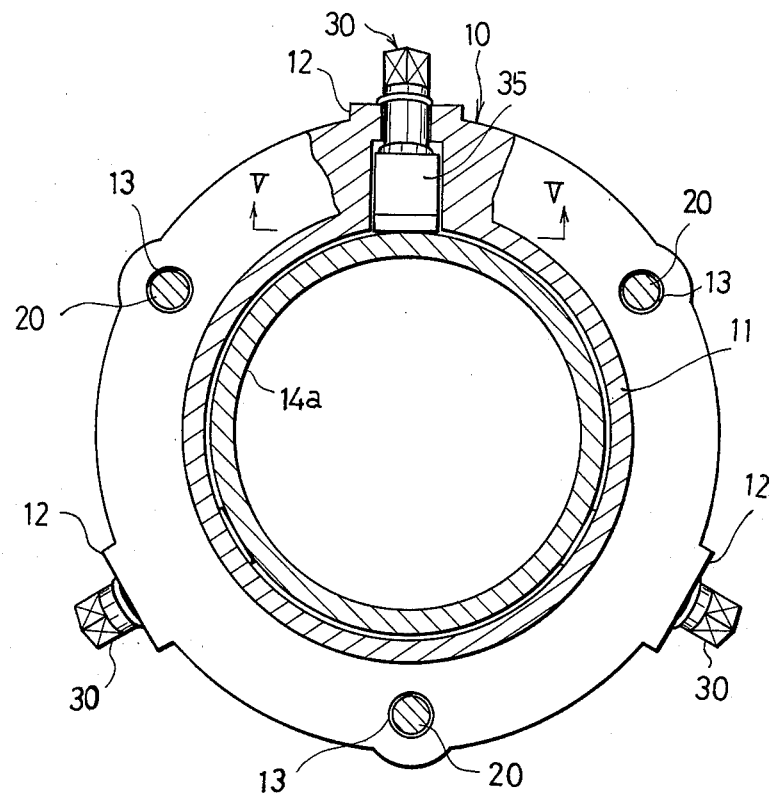
FIG. 3 is an enlarged elevation, with part broken away, taken along the lines III—III of FIG. 1.
Figure 4:
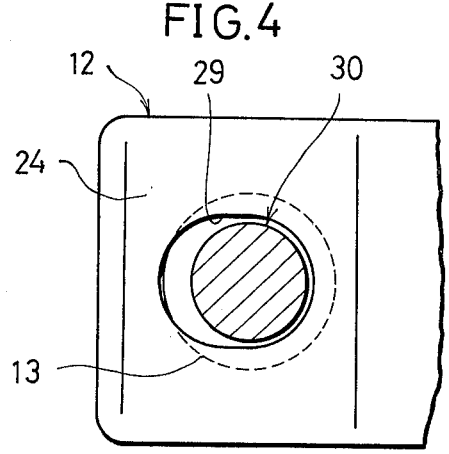
FIG. 4 is an enlarged fragmentary elevation, partly in section, taken along the lines IV—IV of FIG. 1.

Referring now to the drawings, wherein like reference numerals are used throughout the various views to indicate like parts, the pipe junction holder of the present invention comprises a substantially annular body 10 containing an annular projection 11, at least three clamping blocks 12 disposed in spaced relation with one another, and a plurality of internally threaded through holes 13 which extend in parallel with the longitudinal axis of a pipe on which the pipe junction holder is mounted. The pipe junction holder is fixed on one of the the joined pipes 14a, 14b in the manner as illustrated in FIGS. 1 and 3. More particularly, after the pipe 14a is inserted at one end 15 into an annular space of the annular body 10, the end 15 is coupled into an enlarged mouth 16 formed with an opposed end of another pipe 14b. Then, a known packing 17 is provided at the opening portion of said enlarged mouth for providing a seal. At the opening of the pipe 14b is provided an annular flange 18 which has a plurality of through holes 19 which are spaced from one another and extend in parallel with the longitudial axis X—X of the pipes 14a, 14b. The structure of the pipe 14a per se is known in the prior art. When the annular body 10 is mounted on the pipe 14a, the through holes 13 are adjusted in location so as to be axially aligned with the holes 19, so that a fixing bolt 20 with a head 21 may pass through both holes 13, 19 for connecting the annular body 10 to the pipe 14b by tightening a nut 22. As the annular body 10 is connected to the flange 18, the annular projection 11 pushes against the packing 17 for increasing the hermetical effect. In the illustrated embodiment, the clamping blocks 12 and the fixing holes 13 are alternately arranged. However, it is not always necessary to arrange them in this manner. For example, two holes 13 may be disposed after one clamping block 12.

Each clamping block 12 comprises a vertical front wall 23, a lateral top wall 24 which extends descendingly or downwardly away from said front wall 23, and a pair of vertical side walls 25. The walls are integral with one another, so that a hollow internal space 26 is defined by the walls 23, 24, 25. The top wall 24 has an external surface 27 and an internal surface 28, both of which are flat and smooth and extend in the same slanted direction so as to decline away from the front wall 23. The top wall 24 is formed with a non-threaded through hole 29 which is substantially elliptical in shape and extends perpendicularly relative to the descendingly or downwardly slanted top wall 24. In other words, this hole 29 is inclined relative to the axial line X—X of the aligned pipes 14a, 14b.

A bolt 30 having an integral annular flange 31 formed on its shank 32 is received within said non-threaded elliptical hole 29. The bolt 30 should be inserted into the hole 29 from the lower side thereof before the annular body 10 is fixed on the pipe 14a. The bolt 30 should be set in the hole 29 in the manner that the upper slant surface 37a of the integral flange 31 is slidably in contact with the slant surface 28 of the top wall 24. Subsequently the bolt 30 is maintained in place by means of a snap ring 34. The bolt 30 can freely turn within the substantially elliptical hole 29 and also can move within a certain small distance in the direction of the longer diameter of the elliptical hole 29. The bolt shank 32 is formed with threads 33 at a part between its bottom end and the lower side of said annular flange 31.

Figure 5:
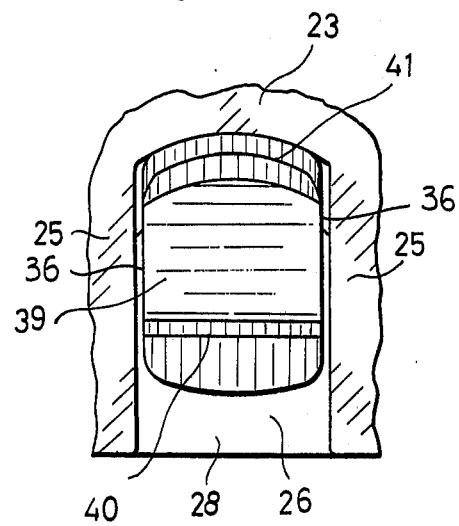
FIG. 5 is an enlarged fragmentary elevational view taken along the line V—V of FIG. 3.

On the threaded portion 33 of the shank, a pipe pressing member 35 is engageably mounted. The member 35 is received within the hollow space 26 of the clamping block 12 in the manner that its side walls 36 are in contact with said side walls 25 of the clamping block 12 as particularly shown in FIG. 5. Thus, the member 35 is prevented from turning within the internal space 26 of the clamping block 12. The upper surface 38 of the member 35 may enter into contactable relation with the lower slant surface 37b of said annular flange 31. The bottom surface 39 includes a pair of edges 40, 41 which are of such configuration so as to securely dent or eat into the wall of the pipe 14a.

Figure 6A:
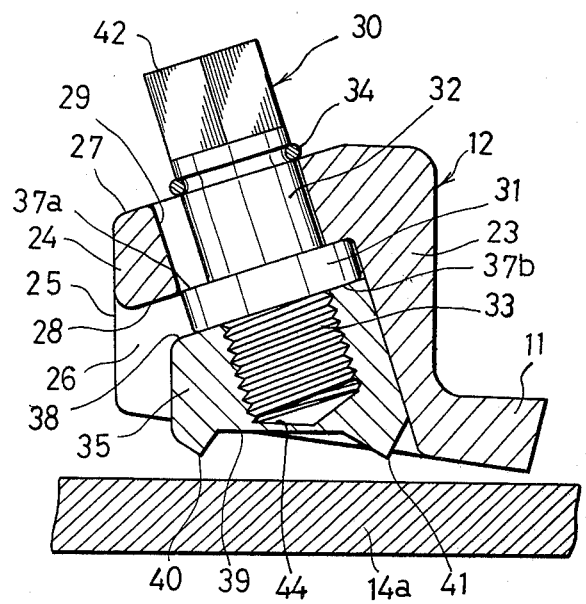
FIGS. 6a to 6c show a series of cross-sectional views of the clamping block of the present invention.
Figure 6B:
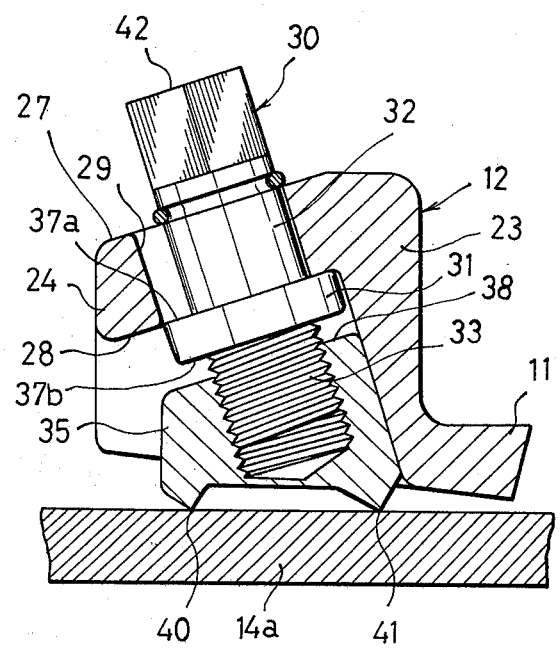
Figure 6C:
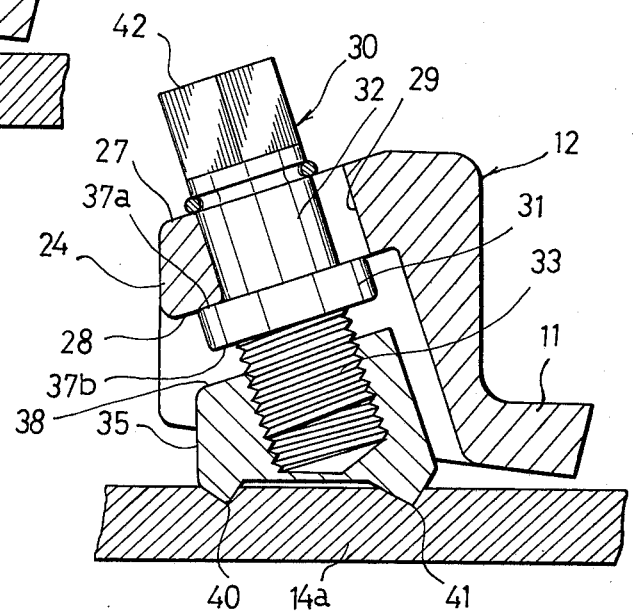

In operation, after the bolt 30 is set in each clamping block 12 as shown in FIG. 6a, the annular body 10 is mounted on the pipe 14a and then connected with the flange 18 of the adjacent pipe 14b by tightening the nuts 22 on the fixing bolts 20 inserted through both holes 13, 19. Subsequently, the bolt is turned by applying a known clamping device such as a spanner or a wrench on the polygonal bolt head 42 until each pipe pressing member 35 presses the periphery of the pipe 14a with a considerable strength as illustrated in FIG. 6b. Thus, the initial pipe holding force is obtained, and so far as in the ordinary condition, the pipe junction is maintained well. When an extraordinary high pressure is applied beyond said initially obtained pipe holding force, the pipe 14b is forcibly moved in the same axial direction with the liquid flow running through the pipes 14a, 14b. At the same time, each bolt 30 is urged to move in the same direction. Simultaneously therewith, the upper slant surface 37a of the flange 31 is forced to slide outwardly along the lower slant surface 28 of the top wall 24, so that the pipe pressing member 35 is pushed downward with a very strong force caused by the extraordinary pressure developed, and a pair of edges 40, 41 of the member 35 securely dent or eat into the pipe wall as shown in FIG. 6c. At this stage, since the bolts 30 are inclined so as to counteract the axial movement of the pipe 14a, the edges 40, 41 securely dent or eat deeply into the pipe wall. Thus, by utilizing the high pressure applied in the axial direction to the internal surface of the pipe by the rapid flow of liquid, the expected pipe junction holding function can be effectively attained.

Figure 7A:
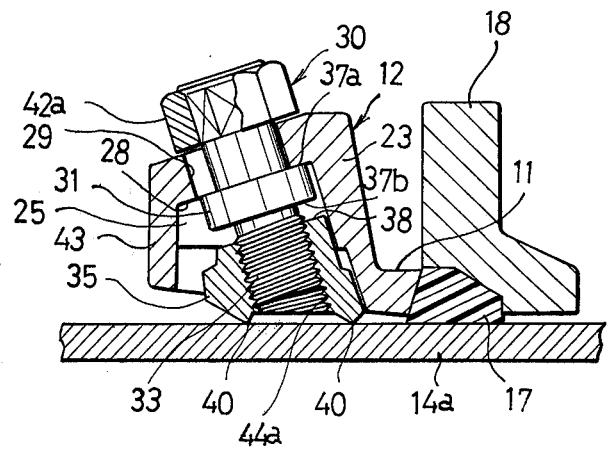
FIGS. 7a and 7b are similar view to FIGS. 6a to 6c, illustrating a modified clamping block of the present invention.
Figure 7B:
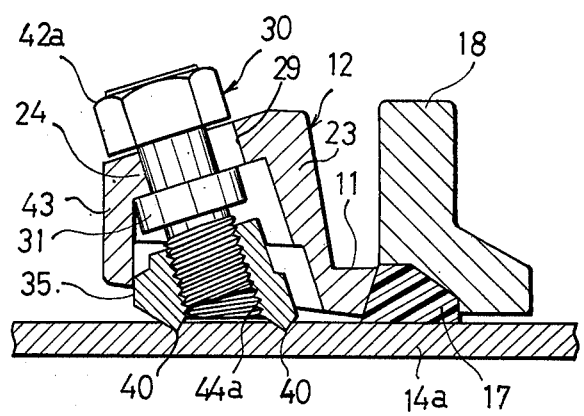

In the modified embodiment as illustrated in FIGS. 7a and 7b, a rear vertical wall 43 is provided in addition to the front vertical wall 23, the inclined top wall 24 and a pair of side walls 26. The rear vertical wall 43 serves as a stopper for restricting the pipe pressing member 35 to move excessively outward, as shown in FIG. 7b. Further, the bolt head shown as member 42a is modified. The diameter of this modified bolt head 42a is larger than the shorter diameter of the elliptical hole 29. Therefore, the snap ring 34 as employed in the first embodiment is unnecessary. The bolt head 42a must be secured to the top end of the bolt shank after it is received in the hole 29. Further, the internally threaded hole 44 of the member 35 of the first embodiment is a blind hole as clearly shown in FIGS. 6a to 6c, while in the modified embodiment, the like hole 44a is a through hole as shown in FIGS. 7a, 7b. Either form of the holes 44, 44a are suitable in performing the desired pipe junction holding function. In other respects, the modified embodiment of FIGS. 7a, 7b is substantially the same as the first embodiment in both of construction and operation.

Figure 8:
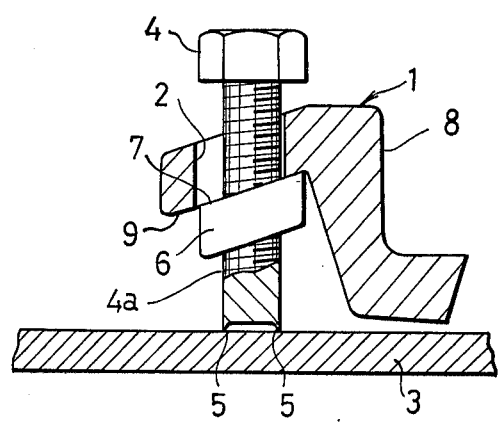
FIG. 8 shows one example of a prior art clamping block which is believed to be most similar to the clamping block according to the present invention.

Representatives of the prior art are Japanese Utility Model Application Nos. 28539/1965 (Publication No. 15176/1969) and 105135/1966 (Publication No. 7260/1970) and the prior art device comprising a plurality of clamping means as illustrated in FIG. 8 of the accompanying drawings. Applicant does not know whether a patent or a utility model application has been filed or not in any country in respect with the illustrated prior art device.

The present invention is distinguishable from any of the teachings of the representative prior arts as above-mentioned in the following manner:

1. In either of the pipe junction holders in Japanese Utility Model Application Nos. 28539/1965 or 105135/1966, a pipe holding force is merely obtained by clamping a plurality of bolts, and none of the devices make use of the axial pressure which is applied to the internal surface of a pipe on which the pipe junction holder is mounted. The pipe holding force obtained by these devices is constant and cannot counteract an extraordinary increase of the pressure applied by the rapid flow of liquid to the internal surface of the pipe so as to let it out, whereas the pipe junction holder of the present invention can counteract to such an increase in applied pressure because a plurality of pipe pressing members are automatically pushed downward to eat into the pipe wall as the pipe is forced to securely dent or move out.

2. In the prior art device as illustrated in FIG. 8, because each bolt is disposed so as to be perpendicular to the longitudinal axis of a pipe on which the device is mounted, a pair of edges formed with the bolt shank end cannot securely dent or eat deeply into the pipe wall. Whereas, the bolt of the present invention is inclined to counteract the axial movement of a pipe on which the pipe junction holder is mounted, a pair of edges provided with each of the bolt shank end can securely dent or eat deeply into the pipe wall, so that the pipe junction holding function is more effectively attained.

3. In the same prior device as shown in FIG. 8, because the bolt is supported in place by a contact relation between a nut on the bolt shank and one extention of a clamping block as well as a small contact relation between a pair of edges on a small distance of the periphery of the pipe, the bolt is unstable and the construction of the clamping block is not durable. Whereas because the bolt of the present invention is supported by a stable contact relation between the top wall and the annular flange which is formed integrally with the bolt shank as well as a wide contact relation between a pair of edges formed with the bottom surface of a pipe pressing member including a sufficient distance, the structure of the clamping block is very strong and durable as well as very stable, whereby the pipe junction holding function is more effectively performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pipe junction holder comprising:
   a substantially annular body which includes a plurality of clamping blocks which are integral with said annular body and are disposed in spaced relation with one another, each of said clamping blocks comprising a hollow internal space defined by a front wall, a pair of side walls, and a top wall which has an inclined internal surface descending away from said front wall;
   said top wall having a non-threaded through hole which is substantially elliptical in shape, having a longer diameter axis directed toward said front wall, and being inclined relative to a longitudinal axis of a pipe on which the pipe junction holder is mounted;
   a plurality of bolts each of which has a bolt shank with an integral annular flange formed therewith, said bolt shank having a threaded portion at a lower part thereof and means for retaining the bolt shank within said hole;
   said bolt shank passing through said hole in such a manner that it assumes the same inclined position as said hole and is freely rotatable therein and movable in the direction of said longer diameter axis of said hole;
   an upper surface of said annular flange being in contact with said inclined internal surface of said top wall and being slidable along said inclined internal surface of said top wall;
   a pipe pressing member which has an internally threaded hole being engageably mounted on said threaded portion of said bolt shank, said pipe pressing member being received within said internal hollow space of each of said clamping blocks in such a manner that it is movable together with said bolt shank substantially in the direction of said longer diameter axis of said hole, said internal hollow space prevents the pipe pressing member from rotating about said bolt shank;
   a plurality of edges being formed on a bottom of said pipe pressing member, each of said edges being of a configuration that permits denting into a peripheral wall of a pipe on which the pipe junction holder is mounted; and
   said pipe junction holder being adapted to be positioned adjacent a second pipe by means of a through hole in the annular body which is aligned with a through hole in an annular flange of a second pipe which may be secured together by means of a fixing bolt.

2. The pipe junction holder of claim 1, wherein said means for retaining the bolt shank is a snap ring mounted adjacent said bolt head.

3. The pipe junction holder of claim 1, wherein said top wall of said clamping block is inclined so as to descend away from said front wall of said clamping block.

4. The pipe junction holder of claim 1, wherein said plurality of edges are a pair of edges formed with the bottom end surface of said pipe pressing member, and a distance between said pair of said edges being at least larger than an external diameter of said bolt shank.

5. The pipe junction holder of claim 1, wherein said internally threaded hole of said pipe pressing member is a blind hole.

6. The pipe junction holder of claim 1, wherein said internally threaded hole of said pipe pressing member is a through hole.

7. The pipe junction holder of claim 1, wherein said pipe pressing member is disposed within said hollow internal space of said clamping block in such a manner that a pair of side walls of said pipe pressing member are in contact with a pair of said side walls of said clamping block in slidable relation with each other.

8. The pipe junction holder of claim 1, wherein a rear wall is formed with said clamping block, said rear wall being integral with said top wall and a pair of said side walls of said clamping block and extending therefrom in a direction substantially perpendicular to a longitudinal axis of a pipe on which the pipe junction holder is mounted.

9. The pipe junction holder of claim 1, wherein an annular projection is formed with said annular body, said annular projection extending from a bottom portion of said front wall in parallel with a longitudinal axis of a pipe on which the pipe junction holder is mounted.

10. The pipe junction holder of claim 1, wherein said through hole comprises a plurality of internally threaded through holes which are formed in said annular body, at least one of said internally threaded through holes being located between a pair of adjacent clamping blocks and extending in parallel with a longitudinal axis of a pipe on which the pipe junction holder is mounted, and a fixing bolt being inserted through each of said internally threaded holes for positioning said pipe junction holder adjacent a through hole in an annular flange of a second pipe.

11. The pipe junction holder of claim 1, wherein said means for retaining the bolt shank is a bolt head whose external diameter is at least larger than the shorter diameter of said elliptical hole.

12. A pipe junction holder to be mounted on a plug end portion of a first pipe for connecting said plug end portion with a socket end portion of a second pipe, said plug end portion being disposed within said socket end portion, and said socket end portion having an annular flange extending radially outwardly from an opening end wall of said socket end portion, said pipe junction holder comprising a substantially annular body which is conventionally bolted to said annular flange formed with said socket end portion of said second pipe, said annular body comprising a plurality of clamping blocks which are integral with said annular body and are disposed in spaced relation with one another, each of said clamping blocks comprising a hollow internal space defined by a front wall, a pair of side walls, and a top wall, said top wall having an internal inclined surface extending descendingly away from said front wall, said top wall having a non-threaded through hole formed therein which is substantially elliptical in shape so as to provide a longer diameter axis and a shorter diameter axis, said longer diameter axis being directed toward said front wall, said non-threaded through hole is formed so as to be inclined in such a manner that its inner end is disposed near said front wall while its outer end is disposed away from said front wall, a plurality of bolts each of which has a bolt head and a bolt shank which has an integral annular flange formed therewith, said bolt shank having a threaded portion at a lower part thereof, said bolt head projecting outwardly from said hole, said bolt shank passing through said hole in such a manner that it takes substantially the same inclined position as said hole, said bolt being held in position by a stopping means which prevents said bolt head from moving into said hole, said bolt shank being freely rotatable within said hole and movable in a direction of said longer diameter axis of said hole, an upper surface of said annular flange formed with said bolt shank being in contact and slidable relation with said inclined internal surface of said top wall, a pipe pressing member which has an internally threaded hole being mounted on said bolt shank with said internally threaded hole engaged with said threaded portion of said bolt shank, said pipe pressing member being disposed within said internal hollow space of each of said clamping blocks in such a manner that said pipe pressing member is movable together with said bolt shank substantially in the direction of said longer diameter axis of said hole of said top wall but is prevented from rotating about said bolt shank by said side walls of said clamping block, and a plurality of edges being formed with a bottom end surface of said pipe pressing member, each of said edges being of configuration that permits denting into a peripheral wall of said first pipe on which the pipe junction holder is mounted.

13. The pipe junction holder of claim 12, wherein said stopping means is a snap ring mounted adjacent said bolt head.

14. The pipe junction holder of claim 12, wherein said stopping means is a bolt head whose external diameter is at least larger than the shorter diameter of said hole elliptical in shape and formed in said top wall of said clamping block.

15. The pipe junction holder of claim 12, wherein said plurality of edges are a pair of edges formed with the bottom end surface of said pipe pressing member, and a distance between said pair of said edges is at least larger than an external diameter of said bolt shank.

16. The pipe junction holder of claim 12, wherein said internally threaded hole of said pipe pressing member is a blind hole.

17. The pipe junction holder of claim 12, wherein said internally threaded hole of said pipe pressing member is a through hole.

18. The pipe junction holder of claim 12, wherein said pipe pressing member is disposed within said hollow internal space of said clamping block in such a manner that a pair of side walls of said pipe pressing member is in contact with a pair of said side walls of said clamping block in slidable relation with each other.

19. The pipe junction holder of claim 12, wherein a rear wall is formed with said clamping block, said rear wall being integral with said top wall as well as a pair of said side walls of said clamping block and extending therefrom in a direction substantially perpendicular to a longitudinal axis of said first pipe on which the pipe junction holder is mounted.

20. The pipe junction holder of claim 12, wherein an annular projection is formed with said annular body, said annular projection extending toward said annular flange formed with said socket end portion from a bottom portion of said annular body substantially in parallel with a longitudinal axis of said first pipe, and a packing means is interposed between said annular projection of said annular body and said annular flange of said socket end portion of said second pipe.

21. The pipe junction holder of claim 12, wherein a plurality of internally threaded through holes are formed in said annular body, at least one of said internally threaded through holes formed in said annular body being located between a pair of adjacent clamping blocks and extending in parallel with a longitudinal axis of said first pipe, and a fixing bolt being inserted through each of said internally threaded through holes of said annular body as well as a hole formed in said annular flange of said socket end portion for connecting said pipe junction holder to said second pipe.

* * * * *